United States Patent
Mueller

[15] 3,650,035
[45] Mar. 21, 1972

[54] FORM GAGE LEAN ADAPTER

[72] Inventor: Charles L. Mueller, Harrisburg, Pa.
[73] Assignee: TRW-Inc., Cleveland, Ohio
[22] Filed: July 22, 1969
[21] Appl. No.: 843,666

[52] U.S. Cl. .........................................33/174 PB, 33/174 P
[51] Int. Cl. .........................................................G01b 5/20
[58] Field of Search......................33/174 PB, 174 TA, 174 L

[56] References Cited

UNITED STATES PATENTS

| | | | |
|---|---|---|---|
| 2,879,602 | 3/1959 | Powers | 33/174 PB |
| 3,270,423 | 9/1966 | Birrell et al. | 33/174 L |
| 3,524,261 | 8/1970 | Klink | 33/174 TA |

*Primary Examiner*—Leonard Forman
*Assistant Examiner*—Dennis A. Dearing
*Attorney*—Hill, Sherman, Meroni, Gross & Simpson

[57] ABSTRACT

A turbine or compressor blade is held in an adapter for a guillotine gage for checking lean in any direction. The adapter includes a plurality of cylindrical forms which are slidingly intercoupled with keys and keyways on adjacent faces to permit relative movement along an X and a Y axis within the confines of a gap generated with respect to the stacking axis of the airfoil under test. The adapter is provided with a series of indicia markings equally spaced at 2° 30' so that the adapter generates the aforementioned circle when adjusted to a predetermined lean tolerance. The gap is formed by parallel conically shaped surfaces, one of these surfaces on one of the cylindrical forms and the other on the inside of a threaded adjusting ring. The ring carries the indicia for which each of the markings of 2° 30' is equal to 0.001 tolerance. Tolerance may therefore be directly set by appropriate adjustment of the ring.

19 Claims, 5 Drawing Figures

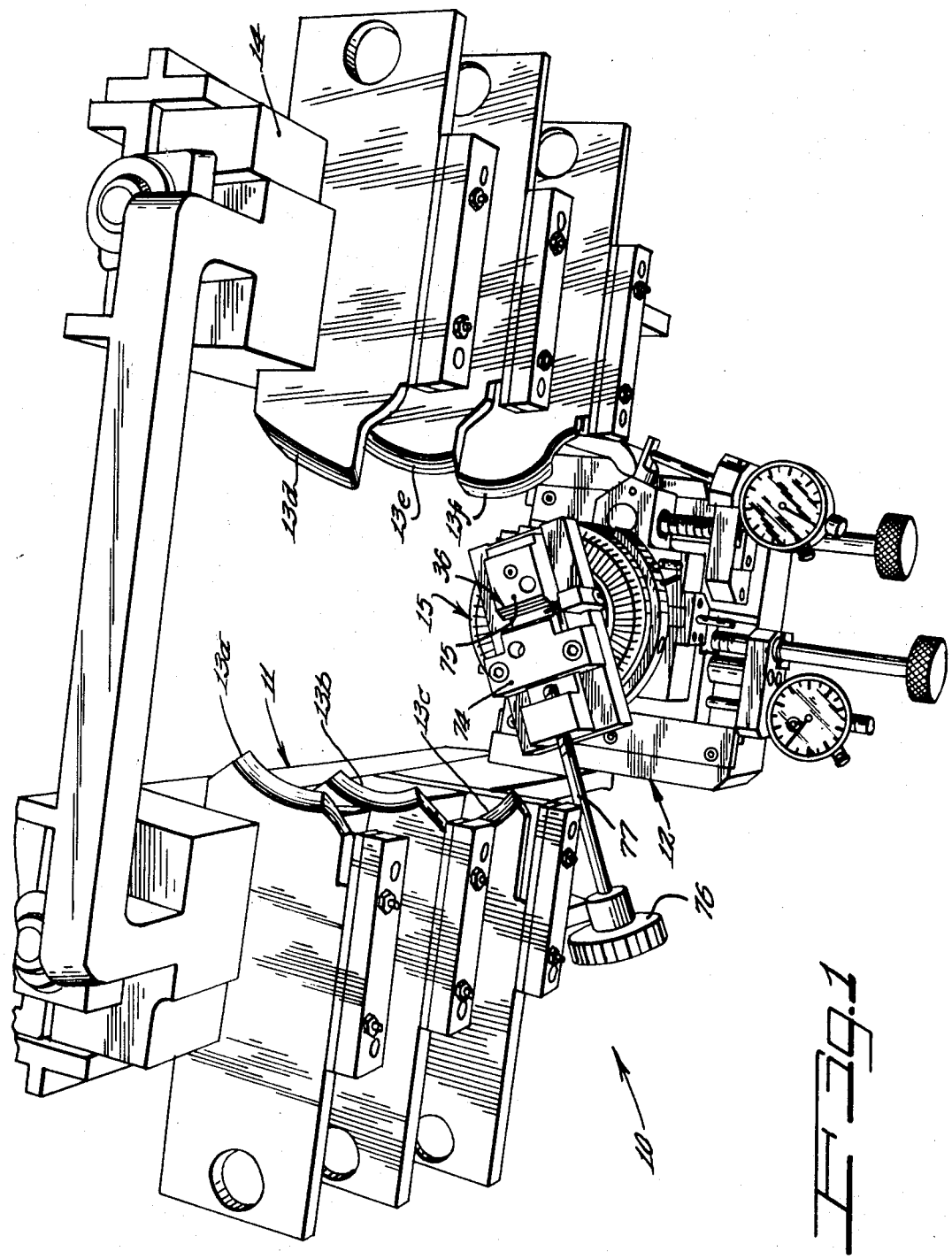

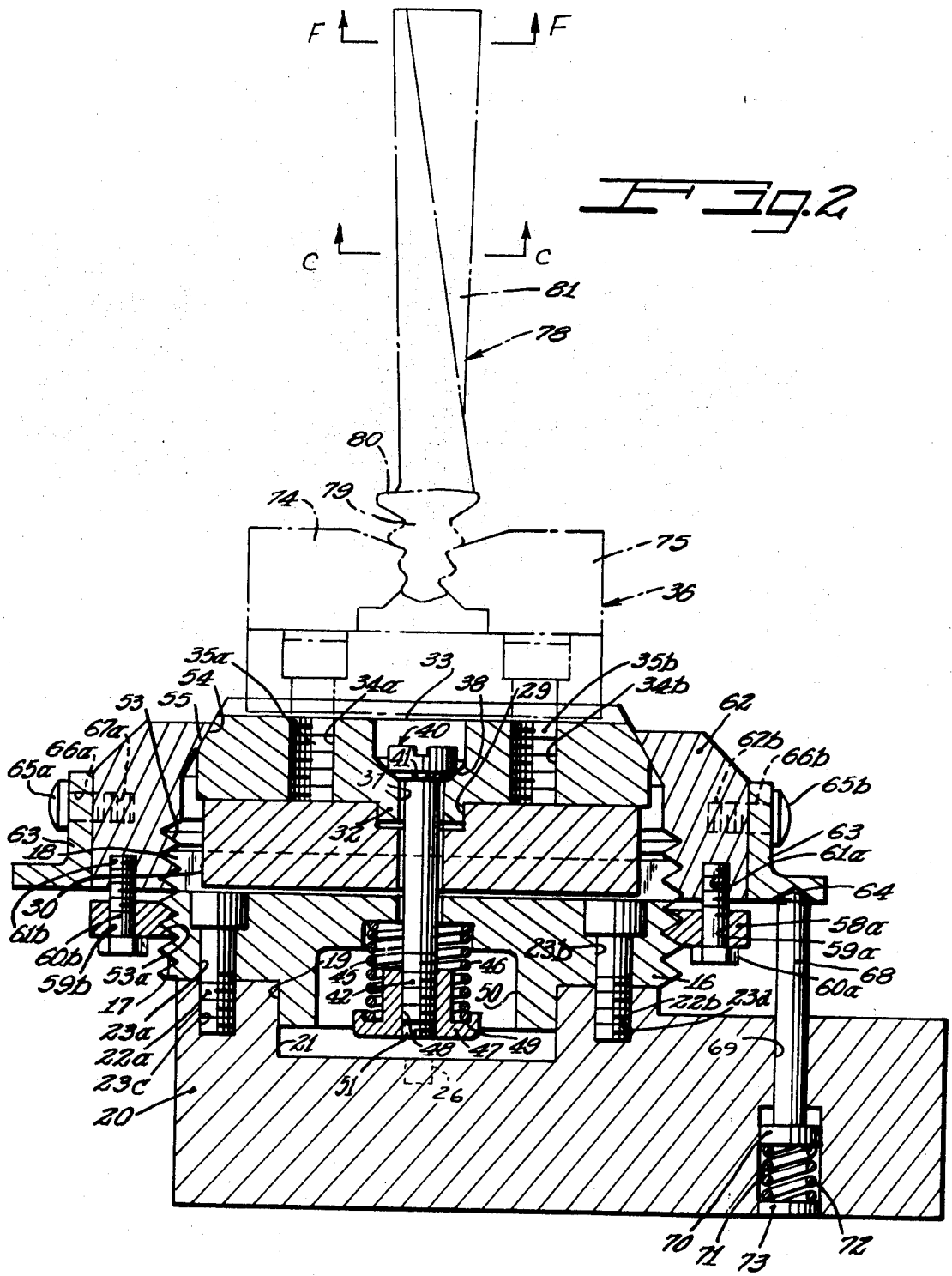

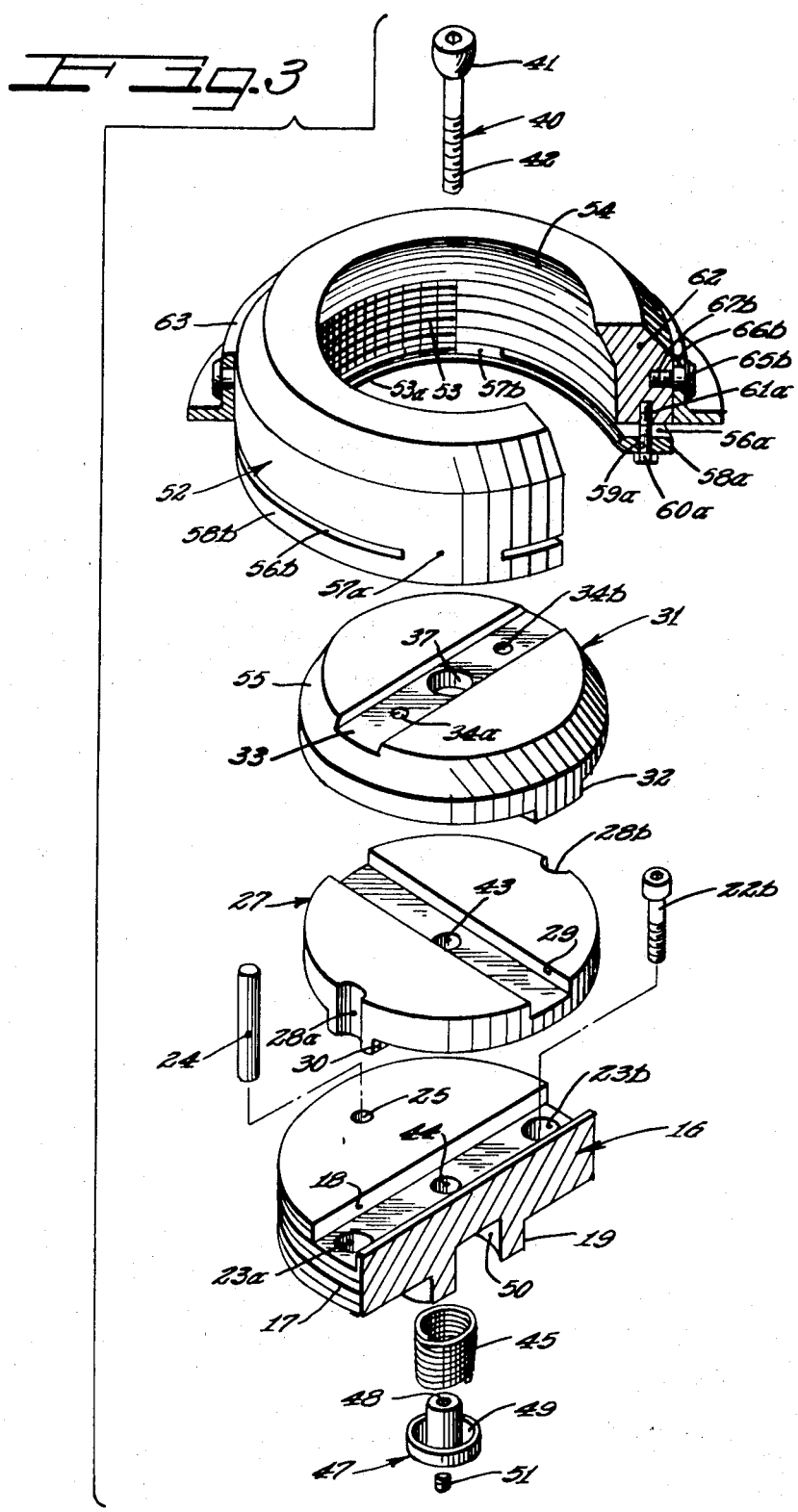

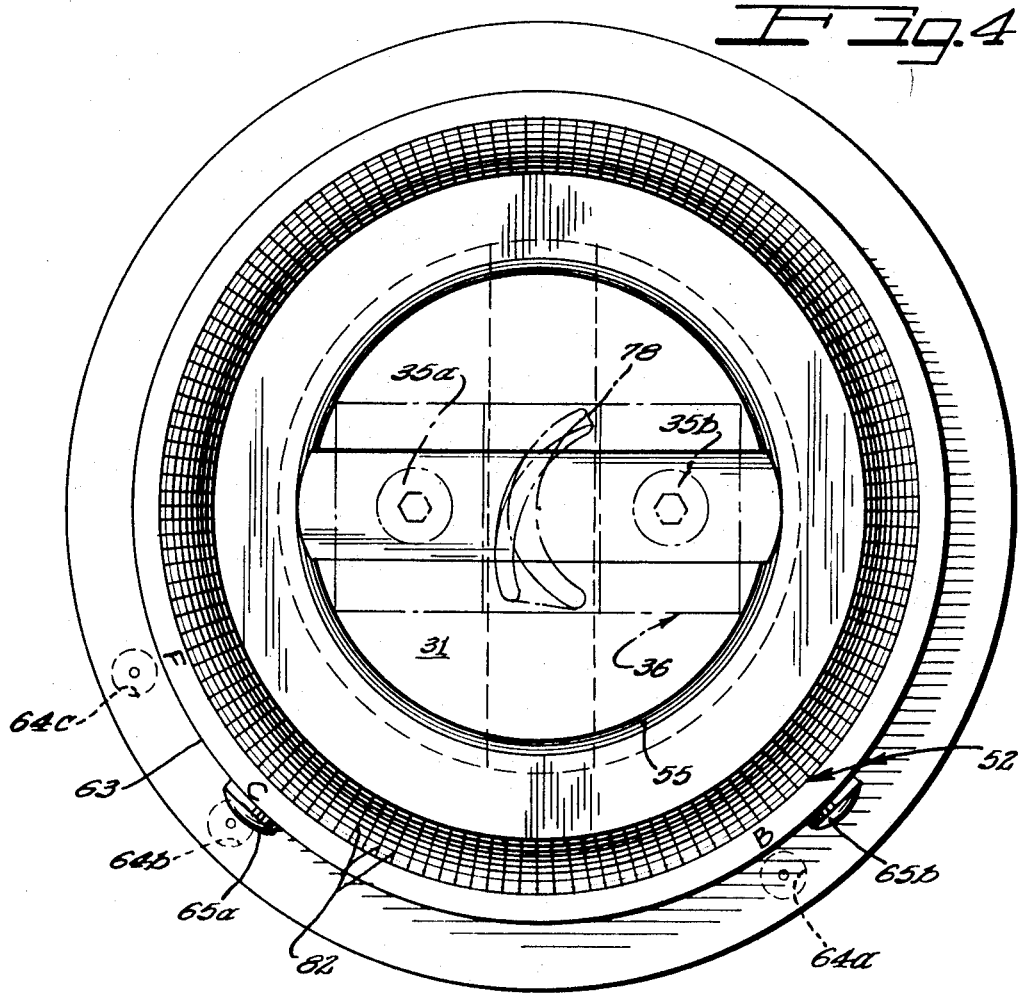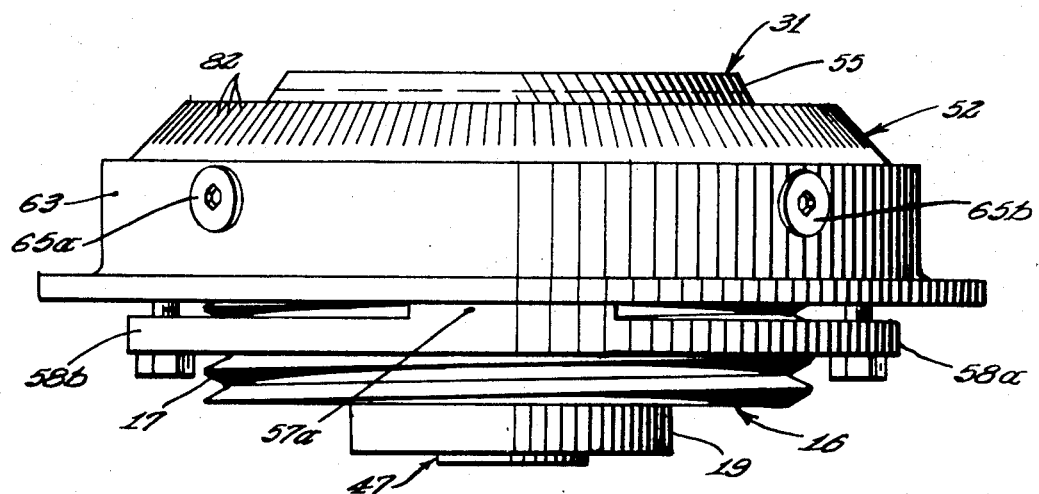

3,650,035

FORM GAGE LEAN ADAPTER

BACKGROUND OF THE INVENTION

1. Field of the Invention

This invention relates to apparatus for gaging airfoil-, and more particularly to apparatus for checking lean during during the manufacture of airfoils.

2. Description of the Prior Art

In the manufacture of turbine blades and compressor blades, bar stock undergoes a number of qualification tests after which it is forged and machined to the approximate dimensions and shape of the desired airfoil. The stock is first forged to provide a root section at one end thereof and a blade portion at the other end thereof, after which a blocking operation is performed to develop the approximate shape of the entire blade. The blade is then forged to shape and machined into a finished product. In finishing a blade, a guillotine gage is employed for periodic checks of size to insure that dimensions of a blade are accurate. As the leading and trailing edges of the airfoils are shaped, the airfoils are checked periodically with form templates to insure that the dimensions thereof are accurate. Heretofore, it has been necessary to take readings of lean deviations of the blades and relate these readings to a look up table to determine whether the blades are within the lean tolerances. This required looking for a complimentary value on the table for every indicator reading.

It is highly desirable, and a primary object of the present invention, to obviate the necessity for a table of complimentary values by providing form gage lean apparatus for direct reading in determination of lean.

SUMMARY OF THE INVENTION

According to the invention, a form gage lean adapter is provided for attachment to a guillotine gage whereby the guillotine gaging operations and form checking may be accomplished more readily. The adapter comprises a plurality of cylindrical members which slidingly engage one another, with two of the members being slidable along an X axis and a Y axis, respectively, in accordance with adjacent enter-engaging keys and keyways of these members. The cylindrical members are located with respect to one another and with respect to the stacking axis of an air foil under test. A screw adapter is secured to the guillotine gage base portion and threadedly engages a calibrated nut carrying indicia of calibration to clamp the cylindrical members together at any selected tolerance reading. The

BACKGROUND OF THE INVENTION

1. Field of the Invention

This invention relates to apparatus for gaging airfoil, and more particularly to apparatus for checking lean during during the manufacture of airfoils.

2. Description of the Prior Art

In the manufacture of turbine blades and compressor blades, bar stock undergoes a number of qualification tests after which it is forged and machined to the approximate dimensions and shape of the desired airfoil. The stock is first forged to provide a root section at one end thereof and a blade portion at the other end thereof, after which a blocking operation is performed to develop the approximate shape of the entire blade. The blade is then forged to shape and machined into a finished product. In finishing a blade, a guillotine gage is employed for periodic checks of size to insure that dimensions of a blade are accurate. As the leading and trailing edges of the airfoils are shaped, the airfoils are checked periodically with form templates to insure that the dimensions thereof are accurate. Heretofore, it has been necessary to take readings of lean deviations of the blades and relate these readings to a look up table to determine whether the blades are within the lean tolerances. This required looking for a complimentary value on the table for every indicator reading.

It is highly desirable, and a primary object of the present invention, to obviate the necessity for a table of complimentary values by providing form gage lean apparatus for direct reading in determination of lean.

SUMMARY OF THE INVENTION

According to the invention, a form gage lean adapter is provided for attachment to a guillotine gage whereby the guillotine gaging operations and form checking may be accomplished more readily. The adapter comprises a plurality of cylindrical members which slidingly engage one another, with two of the members being slidable along an X axis and a Y axis, respectively, in accordance with adjacent enter-engaging keys and keyways of these members. The cylindrical members are located with respect to one another and with respect to the stacking axis of an air foil under test. A screw adapter is secured to the guillotine gage base portion and threadedly engages a calibrated nut carrying indicia of calibration to clamp the cylindrical members together at any selected tolerance reading. The calibrated nut and one of the cylindrical members have complimentary conically shaped surfaces which part selected distances upon rotation of the nut to selectively generate annular boundaries concentric with the stacking axis and thereby select tolerances so that the cylindrical members are free to move along the X and Y axis within the confines of the circular gap created between the conically shaped surfaces. The gap therefore defines the permissable tolerance at any selected profile of a blade and the amount of permissable movement along the X and Y axes determines whether the blade is within tolerance.

BRIEF DESCRIPTION OF THE DRAWINGS

Other objects, features and advantages of the invention, its organization, construction and operation will be readily apparent from the following description of a preferred embodiment thereof, taken in conjunction with the accompanying drawings, although variations, and modifications may be effected without departing from the spirit and scope of the novel concepts of the disclosure, and in which:

FIG. 1 is a pictorial representation of a guillotine gage having a form gage lean adapter mounted thereon according to the invention;

FIG. 2 is a cross-sectional elevational view of a form gage lean adapter according to the present invention;

FIG. 3 is an exploded view of a form gage lean adapter according to the invention;

FIG. 4 is a top view of a form gage lean adapter according to the invention; and FIG. 5 is an elevational view of the form gage lean adapter of FIG. 4.

DESCRIPTION OF THE PREFERRED EMBODIMENT

In the drawings, there is generally shown at 10 a guillotine gage 11 including a table portion 12 and a plurality of guillotine blades 13, further referenced 13a–13f, which are secured to a frame 14.

A lean adapter 15 is mounted on the table portion 12 of the gage apparatus and comprises a screw adapter 16 having a threaded outer surface 17. The screw adapter includes a groove 18 which extends diametrically across its upper face centrally of the Y axis of the gage. A pilot diameter 19 extends from the lower face of the screw adapter 16 to locate the screw adapter within a bore 21 of the guillotine gage turret 20. A pair of screws 22, further referenced 22a and 22b, are provided for securing the screw adapter 16 to the turret 20. The screws 22a and 22b extend through corresponding holes 23a and 23b of screw adapter 16 and threadedly engage thread holes 23c and 23d, respectively, in the turret 20.

A cylindrical member 27 is slidably mounted on top of screw adapter 16 with a key 30 which extends diametrically across its lower surface being received by groove or keyway 18 of screw adapter 16. The cylindrical member 27 includes a pair of indentions 28a and 28b in the periphery thereof for providing clearance for screws 22a and 22b. A pin 24 is received by a hole 25 in the screw adapter 16 and a hole 26 aligned within the guillotine turret 20 to properly index components 16 and 27 and prevent rotation.

The cylindrical member 27 is provided with a groove or keyway 29 which extends diametrically across the upper surface thereof and lies centrally of the X axis of the gage apparatus. The keyway 29 receives a cooperable key 32 which extends diametrically across the undersurface of a second cylindrical member 31 to provide a sliding engagement between the cylindrical members along the X axis of the gage apparatus. The second cylindrical member has a groove 33 formed in the top surface thereof diametrically thereacross and centrally of the Y axis of the apparatus to permit the mounting of the blade holding apparatus 36 by means of a pair of screws 35a and 35b which threadedly engage threaded holes 34a and 34b of the second cylindrical member 31.

The second cylindrical member 31 includes an axial bore 37 therethrough having a conical section 38 for receiving a correspondingly shaped conical section 41 of a screw 40. Screw 40 includes a threaded shaft 42 which extends through bore 37 and align bores 43 of the first cylindrical members 27 and 44 of the screw adapter 16. A cylindrically shaped compression spring 45 axially receives threaded shaft 42 and is secured between a bore 46 of screw adapter 16 and a groove 49 of a nut 47 which has a threaded bore for receiving threaded shaft 42. A lock screw 51 is also received by the threaded bore 48 for locking screw 40 in place.

The axial bores 44, 43 and 37 of the screw adapter 16, first cylindrical member 27 and second cylindrical member 31, respectively, are oversized with respect to the diameter of the shaft 42 to permit travel of the first and second cylindrical members along the X and Y axes of the apparatus.

A cylindrical nut 52 has an internal thread 53 for engaging the threads 17 of the screw adapter 16. The cylindrical nut 52 also includes an internal conical surface 54 which corresponds in shape to a conical surface 55 of the second cylindrical member 31. Lower portion of the cylindrical nut 52 is provided with a pair of slots 56a and 56b cut across the diameter thereof to within approximately ½ inch of each other at diametrically located positions 57a and 57b to provide a pair of spring portions 58a and 58b on opposite sides of the nut 52. Each of the spring portions 58a and 58b are provided with clearance holes 59a and 59b, respectively for receiving screws 60a and 60b, respectively. The screws 60a and 60b engage threaded bores 61a and 61b in the main body 62. Adjustment of these screws during assembly of the nut 52 to the screw adapter 16 removes any possibility of thread backlash.

A cylindrical detent ring 63 is provided circumferentially about the cylindrical nut 52 and is secured thereto by means of a pair of screws 65a and 65b which engage threaded bores 67a and 67b in the main body 62 of the cylindrical nut 52 through access holes 66a and 66b, respectively. The cylindrical detent ring 63 includes a plurality of detents 64, further referenced 64a, 64b and 64c to provide proper positioning of the cylindrical nut 52 during assembly, when engaged with a detent pin 68. The detent pin 68 extends vertically through a bore 69 in turret 20 and includes a head 70 which is located in a counterbore portion 71 of turret 20. The detent pin 68 is spring loaded by provision of a compression spring 72 between the head 70 of the detent pin and a plug 73 which seals the counterbore 71 of the turret 20.

As shown in FIG. 1 (and as shown in phantom in FIG. 2), the apparatus is provided with gripping jaws 74 and 75 which are movable relative one another by means of an adjusting knob 76 having a threaded adjusting shaft 77. The jaws 74 and 75 receive and clamp the root 79 of a blade 78 therebetween with the blade centered with respect to the apparatus in accordance with the stacking axis of the air foil 81. The blade 78 is further shown to include a shoulder portion which divides the blade portion from the root portion at 80.

The form gage lean adapter is assembled by securing the screw adapter 16, cylindrical member 27 and cylindrical member or mounting disc 31 together with the screw 40, the compression spring 45, the nut 47 and the lock screw 51. Screws 22a and 22b are employed to secure the just-assembled members to the turret 20. The cylindrical nut 52 with the detent ring 63 assembled thereto is threaded onto the aforementioned sub-assembly and adjusted for thread backlash with screws 60a and 60b. The cylindrical nut is turned on its thread 53 until the conical surface 54 thereof engages the conical surface 55 of the mounting disc 31, thus restricting travel of the cylindrical members in any direction. This is known as the basic closed position.

Turning the cylindrical nut 52 counterclockwise until a premachined detent 64 in detent ring 63 engages the detent pin 68 provides a circular gap between the conical surfaces 54 and 55, which gap is concentric with the stacking axis of the airfoil. The mounting disc 31 and the cylindrical member 27 are moved in directions along both the X and Y axes by means of the keys and keyways provided, for example elements 29 and 32, over the distance of the circular gap generated in any direction from its original center without any rotation of the part. Therefore, the apparatus satisfies the part requirement of lean in any direction.

The following illustrative example is given in order that the foregoing operations may be best understood. The cylindrical nut 52 includes a surface which is provided with a series of indicia marks 82 equally spaced-apart at, for example, 2° 30'. Each of 2° 30' intervals is equal to a tolerance of 0.001 lean. Assuming that the part is permitted a lean of 0.040 in any direction at section F—F and a lean of 0.030 in any direction at section C—C; the detent ring 63 is rotated 40 marks from the basic position B to the detent mark F, since 0.001 lean equals 2° 30'; the rotation is 40 × 2° 30', or 100°. The part can now be moved along the X and Y axes in any direction between the confines of the gap generated between conical surfaces 54 and 55 of the cylindrical screw 52 and the mounting disc 31 to permit check of the form of the part at this section to a template. The detent ring 63 is then rotated to the detent marked C 30 marks from the basic position B; whereat the rotation is 30 × 2° 30', or 75°. The part can now be moved along the X and Y axes in a direction within the confines of the new gap generated between the conical surfaces 54 and 55 to permit checking of the form of the part to the template at this section. Rotation of the detent ring 63 back to the basic position B locks the part in the basic position to permit regular routine guillotine gage functions to be performed.

Generally then there has been described a form gage lean adapter for a guillotine gage which permits direct checking of lean tolerance with respect to the template at any desired section by merely selectively rotating a dial to set the permissable tolerance. The part under test may then be moved along the X and Y axes of the apparatus in any direction within the confines of a circular gap generated by setting of the dial, representing and being formed in accordance with the permissable lean tolerance at the desired section of the airfoil under test. Accordingly, the necessity of taking readings for lean deviation and looking up complimentary values thereof in a table is obviated.

What I claim is:

1. Apparatus for checking lean tolerance of an airfoil having a stacking axis, comprising: first means for holding the airfoil; said first means mounted for movement normal to the stacking axis for positioning the airfoil adjacent a form template; and second means associated with said first means and operable to selectively generate annular boundaries with respect to said first means, said boundaries concentric with the stacking axis and corresponding to lean tolerances at selected sections of the airfoil to limit movement of said first means and airfoil toward the form template.

2. The apparatus according to claim 1, wherein said first means comprises a plurality of members which are slidably engaged with each other for movement along respective axes normal to the stacking axis, one of said members including a first conically-shaped surface, and said second means comprises a selectively adjustable member including a second conically shaped surface disposed about and conforming to the shape of said first surface, said adjustable member being movable relative said one member to generate an annular gap between said first and second surfaces the width of which corresponds to a selected lean tolerance.

3. The apparatus according to claim 1, wherein said first means includes means for moving the airfoil in any direction along X and Y axes normal to the stacking axis of the airfoil.

4. The apparatus according to claim 1, wherein said first means comprises a plurality of members, a first of said members being fixed, a second member carried on said first member, a first key on one of said first and second members and a corresponding first keyway in the other of said members disposed for relative movement of the members along a first axis normal to the stacking axis, a third member carried by said second member, a second key on one of said second and third members and a corresponding second key way in the other of said second and third members disposed for relative movement of the second and third members along a second axis normal to the stacking axis of the airfoil and normal to said first axis, said third member including a first conically shaped surface, and said second means comprises an adjustable member coupled to said first member, said adjustable member including a second conically shaped surface parallel to said first conically shaped surface, said adjustable member movable relative said third member to provide a gap of selected width between said two conically shaped surfaces corresponding to the lean tolerance at a selected section of the airfoil.

5. Apparatus for restricting movement of a formed element relative a form template, comprising:
first means fixed with respect to the template,
second means mounted on said first means for reciprocal movement along a first axis,
third means mounted on said second means for reciprocal movement along a second axis that is perpendicular to said first axis, said third means including
means for holding the formed element, and
fourth means embracing said first, second and third means and including means forming a boundary within which said second and third means are free to move along said first and second axes respectively.

6. The apparatus set forth in claim 5, wherein said first, second and third means are of substantially cylindrical shape and each include a central bore therethrough, and said apparatus further comprises fastening means including a shaft of lesser diameter than the diameters of said bores extending through said bores for securing said first, second and third means together while permitting relative movement along said first and second axes.

7. The apparatus set forth in claim 6, wherein said bore of said third means includes a conically shaped surface and said fastening means includes a conically shaped surface conforming thereto.

8. The apparatus set forth in claim 6, wherein said fastening means includes means for engaging said shaft and spring means disposed between said engaging means and said first means for urging said shaft toward a predetermined position.

9. The apparatus set forth in claim 6, wherein said fastening means comprises means for locking said shaft to prevent rotation thereof.

10. The apparatus set forth in claim 5, wherein said first means and said second means are slidably engaged, one of said means including a key protruding therefrom and the other of said means including a keyway therein for receiving said key, said key and keyway lying along said first axis.

11. The apparatus set forth in claim 5, wherein said second means and said third means are slidably engaged, one of said means including a key protruding therefrom and the other of said means including a keyway therein for receiving said key, said key and keyway lying along said second axis.

12. The apparatus set forth in claim 5, wherein said first means includes a first cylindrical threaded surface, said fourth means includes a second cylindrical threaded surface engaging said first threaded surface and rotatably adjustable relative thereto, said third and fourth means including respective parallel conical surfaces which part to a gap of selective width upon rotation of said fourth means, the gap defining the tolerance of said formed element and said parallel surface of said fourth means defining said boundary.

13. The apparatus set forth in claim 12, wherein said fourth means includes an outer surface and spaced-apart indicia markings on said outer surface corresponding to predetermined tolerances.

14. The apparatus set forth in claim 12, wherein said fourth means includes means for preventing thread backlash between the threads of said first cylindrical surface and the threads of said second cylindrical threaded surface.

15. The apparatus set forth in claim 12, wherein said fourth means includes an annular ring having at least one slot therein generally perpendicular to the axis of rotation of said ring dividing said ring into at least two portions one of which is movable with respect to the other and both of which carry said first cylindrical threaded surface, and means for moving said one portion with respect to the other portion to prevent thread backlash between said first and second cylindrical threaded surfaces.

16. Apparatus for checking the form of an element against a corresponding template, said apparatus comprising:
a frame including a base and means for holding a form template;
first means secured to said base and fixed with respect to said form template;
second means mounted for reciprocal movement on said first means along a first axis;
third means mounted for reciprocal movement on said second means along a second axis normal to said first axis and including means for holding a formed element, the movement of said second and third means along said axes permitting a form comparison of the element to the template in any direction; and
fourth means for limiting movement of said second and third means, said fourth means being adjustable to establish a boundary within which said second and third means may move corresponding to a predetermined tolerance between the formed element and the template.

17. Apparatus according to claim 16, wherein said fourth means is rotatably coupled to said first means, and comprising indicia for indicating predetermined tolerances corresponding to predetermined angular positions of said fourth means.

18. Apparatus for checking the lean tolerance and form of a formed element with respect to a corresponding form template, comprising
frame means including means for holding a form template and base means having first and second bores therein,
a first disc-shaped member having an upper surface and a lower surface, a protrusion formed on its lower surface extending into said first bore, a third bore, a first keyway formed in its upper surface diametrically thereacross, and a threaded peripheral surface,
a pin disposed in said second and third bores to locate said first disc-shaped member relative said base,
a second disc-shaped member having an upper surface and a lower surface, a first key formed on its lower surface extending diametrically thereof and slidably disposed in said first keyway, and a second keyway formed in its upper surface perpendicular to said first key and first keyway to provide first and second coordinate axes,
a third disc-shaped member having an upper surface and a lower surface, a second key formed diametrically across its lower surface and slidably disposed in said second keyway, and a first conically shaped surface,
means mounted on said third disc-shaped member for holding a formed element, the element being thereby movable toward the corresponding form in any direction as provided by said coordinate axes, and a ring-shaped nut including an inner threaded surface portion rotatably engaging said threaded peripheral surface of said first disc-shaped member, a second conically shaped inner surface portion parallel to said first conically shaped surface of said third disc-shaped member, and an outer surface carrying spaced-apart indicia thereon corresponding to predetermined tolerance settings for rotation of said ring-shaped nut, said parallel surfaces parting an mount corresponding to a selected tolerance upon rotary setting of said nut and said second conically shaped inner surface portion defining the limits of movement of said second and third disc-shaped members within a selected tolerance.

19. Apparatus according to claim 18, comprising a ring circumferentially surrounding and fixed to said ring-shaped nut including at least one detent therein defining a zero tolerance setting of said apparatus, and said base means including a spring loaded detent shaft for indexing said ring-shaped nut to the zero tolerance setting.

* * * * *

UNITED STATES PATENT OFFICE
CERTIFICATE OF CORRECTION

Patent No. 3,650,035      Dated March 21, 1972

Inventor(s) Charles L. Mueller

It is certified that error appears in the above-identified patent and that said Letters Patent are hereby corrected as shown below:

Column 1, line 5, read "airfoil-" as --airfoils--;
           line 6, read only one "during";
Column 1, line 32 to Column 2, line 2 do not read the "SUMMARY OF THE INVENTION" or the "BACKGROUND OF THE INVENTION", a double recitation;

Signed and sealed this 10th day of April 1973.

(SEAL)
Attest:

EDWARD M. FLETCHER, JR.
Attesting Officer

ROBERT GOTTSCHALK
Commissioner of Patents